Sept. 21, 1954  A. W. STALLER  2,689,713
APPARATUS FOR MIXING THE COMPOUNDING AGENTS OF PLASTIC POWDERS
Filed March 21, 1952

INVENTOR

Patented Sept. 21, 1954

2,689,713

UNITED STATES PATENT OFFICE 2,689,713

APPARATUS FOR MIXING THE COMPOUNDING AGENTS OF PLASTIC POWDERS

Alfred W. Staller, Trenton, N. J., assignor to Crescent Insulated Wire & Cable Company, Inc., a corporation of New Jersey Application March 21, 1952, Serial No. 277,820

3 Claims. (Cl. 259—15)

In a copending application filed by Edward C. Strube under date of January 15, 1949, Serial No. 71,186 (owned by the assignee of the present application) now abandoned, there is disclosed a novel process and novel apparatus for producing plastic powders suitable for molding or extruding. A typical molding powder formula is given in said application, consisting by weight of 100.0 parts of polyvinyl chloride resin (the basic resin), 10.0 parts of lead basic carbonate (a heat stabilizer), 7.0 parts of clay (a filler), 0.25 parts of color variable, and 52.0 parts of dioctyl phthalate or tricresyl phosphate (a liquid plasticizer).

This particular formula is especially useful for the production of insulations for electrical wires and cables.

According to the Strube process, all of the ingredients of the molding powder, except the plasticizer, such as the basic resin, the filler, the pigment or dye and the stabilizer, in finely divided form, are charged into a rotary mixing vessel which is externally heated to a temperature of from 200° to 250° F. After charging, the vessel is sealed to the atmosphere and the interior subjected to a vacuum of from 25 to 30 inches of mercury. This heat-vacuum treatment is maintained throughout the whole process.

While the first stage of the process is in progress, the plasticizer (which is of the solvent type with respect to the basic resin) is heated in a separate outside container to the temperature of the mix particles and then admitted into the mixing vessel under atmospheric pressure (because of the vacuum) and continuously sprayed upon the mix particles as they are tumbled about and agitated by the rotation of the vessel. The introduction of the heated plasticizer into the mixing vessel represents the start of the second stage of the process which is continued for about thirty minutes, and during this second stage, the mix particles, by the continued rotation of the mixing vessel, will be thoroughly and uniformly coated and impregnated with the solvent plasticizer. Due to the action of heat and vacuum, any air, occluded gases, moisture and volatiles, including the low fraction volatiles of the plasticizer itself, will be driven off, leaving the resulting mix (notwithstanding the addition of the liquid plasticizer) in dry finely divided or powder form ready for molding or extruding without any further treatment whatever.

The present invention is directed to an improvement upon the Strube process and apparatus with respect to the manner in which the plasticizer is introduced into the mixing vessel. This improvement, specifically, consists in admitting the plasticizer directly within the body of the mix particles by submerging the discharge nozzle therein, as will be more fully described hereinafter. Greatly improved results are thus obtained.

Figure 1:
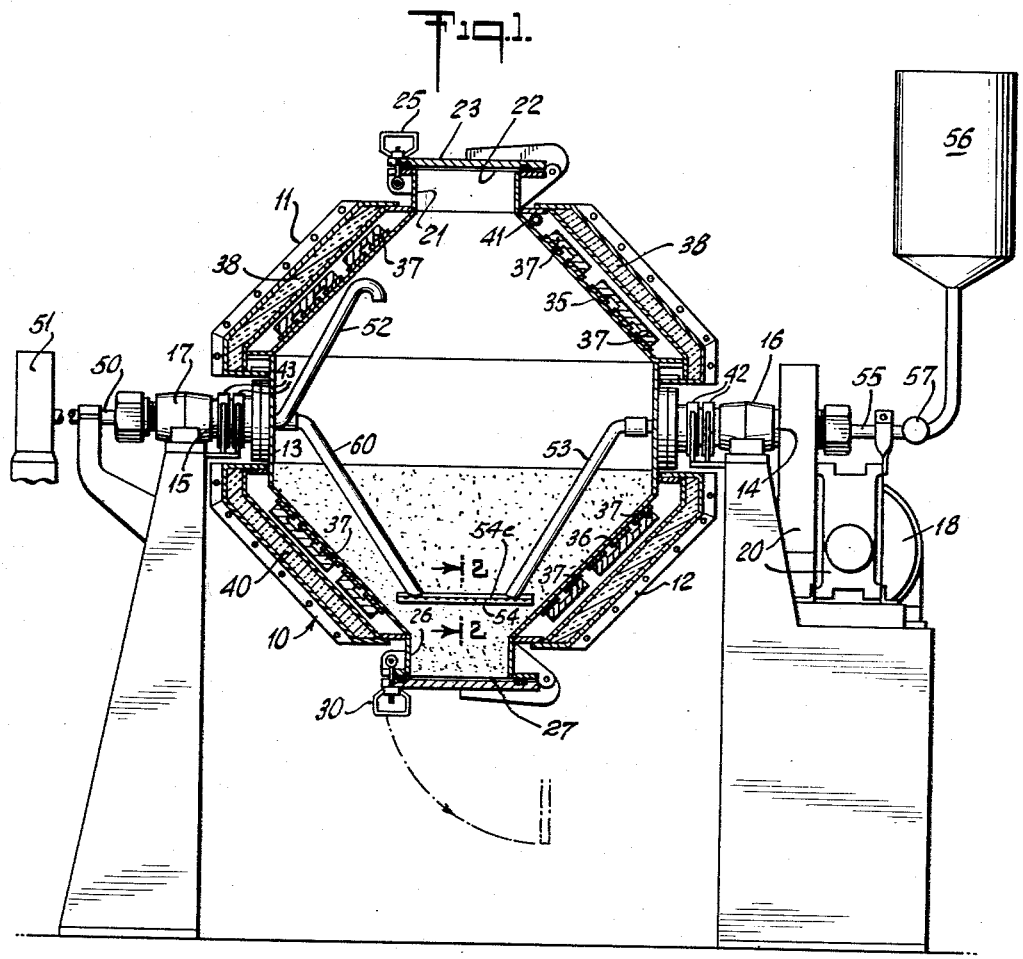
Fig. 1 is a vertical cross section taken through the mixing vessel.

Referring to the drawing, the mixer comprises a vessel 10, shown of the double cone type, having two similar opposed coaxial end sections 11 and 12 of generally frusto-conical shape interconnected by an intermediate section 13 of generally cylindrical shape. This vessel 10 is provided with means for stirring or agitating the charged contents thereof. To that end, the vessel 10 is mounted for rotation desirably by means of coaxial stud shafts 14 and 15 affixed to diametrically opposite sides of the intermediate vessel section 13 and journalled in bearings 16 and 17 respectively. One of these shafts 14 is driven, as for example, through a motor 18 and a reduction gear transmission 20.

The smaller outer end of the conical vessel section 11 has a neck 21 defining a charging opening 22 and carries a closure 23 therefor, shown in the form of a hinged door adapted to be locked in air-tight sealing position across said opening, as for example, by means of a hinged screw clamp 25. The smaller end of the other conical vessel section 12 is similarly provided with a neck 26 defining a discharge opening 27 and similarly carries a hinged sealing door 28 therefor, releasably fastened by means of a hinged screw clamp 30. Since the vessel 10 is substantially symmetrical about a medial transverse plane, either one of the coaxial openings 22 or 27 may serve as the charging opening and the other the discharging opening, depending on the rotative position of the vessel.

Means are provided for heating the vessel 10, to heat its contents. In the specific form shown, the conical vessel sections 11 and 12 are provided for that purpose with respective inner metal shells 35 and 36, supporting on their outer surfaces electric heating units 37, desirably in the form of metal strips. These heating units 37 are enclosed within insulation housings 38 and 40 defining the outer walls of the conical vessel sections 11 and 12 respectively. A thermostat 41 adjacent the heating units 37 and controlling the circuit thereof is shown having a connection to commutators 42 on the shaft 14. The shaft 15 similarly carries commutators 43 for connection to the heating units 37. Electrical connection is thereby established from a suitable source of electric current, through commutators 42 and 43 to the heating units 37 and thermostat 41.

The interior of the vessel 10 is maintained under vacuum, which is desirably between 25 and 30 inches of mercury but which, as far as certain aspects of the invention are concerned, may be from a few inches to 30 inches. For that purpose, one of the shafts 15 is shown axially hollow to permit a suction line 50 to pass axially therethrough from a vacuum pump 51 to the interior of the vessel 10. Inside the vessel 10, the suction line 50 has near one side of said vessel a stationary upwardly extending goose neck pipe 52 which is located in the vertical diametrical plane of the vessel in upright position of said vessel shown and which has its open suction end facing downwardly.

The plasticizer is delivered into the interior of the mixing vessel 10 through a stationary feed pipe 53 extending axially through the shaft 14 and connected by an outside line 55 to a tank 56 containing the liquid plasticizer which, because of the vacuum within the mixing vessel, may be under atmospheric pressure. A needle valve 57 in the line 55 controls the rate of flow of the plasticizer through the feed pipe 53. A tank 56 is provided with suitable heating means (not shown) for heating the plasticizer up to and maintaining it at substantially the temperature of the mix in the vessel 10.

In the Strube application, the feed pipe 53 extends into the mixing vessel in a straight horizontal axial direction and is formed along its lower side with a series of spray nozzles adapted to project the plasticizer downwardly upon the surface of the mix particles.

According to the present invention, the feed pipe 53 is bent downwardly at an angle in the vertical axial plane of the mixing vessel and is provided at its lower end with a horizontally disposed elongated nozzle 54 located centrally in the narrow zone of the bottom cone section and well below the level of the mix, which level is approximately above the lower cone section 12 or a few inches below the axis of the vessel. A similar stationary pipe section 60, attached to the suction pipe 50 or otherwise rigidly supported at that side of the mixing vessel, is bent downwardly and makes connection with the discharge nozzel 54 to give it additional support.

The discharge nozzle 54 is formed throughout its length over an extended area with a series of small discharge passages 54ª leading laterally and horizontally from a central longitudinal manifold passage 54ᵇ, which latter communicates with the feed pipe 53 but is deadended adjacent the supporting pipe section 60.

Figure 2:
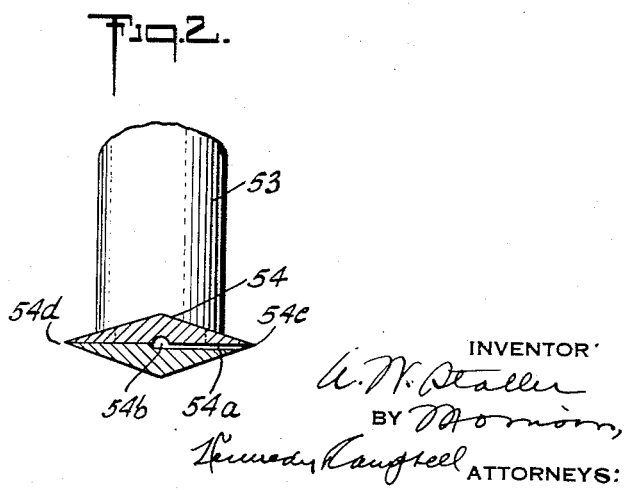
Fig. 2 is a cross section taken through the discharge nozzle on the line 2—2 of Fig. 1.

As will be noted from Fig. 2, the nozzle 54 is diamond shaped in cross section, being tapered down to knife edges 54ᶜ and 54ᵈ at its front and rear sides, respectively. While the discharge passages 54ª might extend in either direction, they preferably and as shown extend forwardly or in the direction of rotation of the mixing vessel, emerging just below the front knife edge 54ᶜ. As thus shaped, the material under treatment may sweep past the discharge nozzle with the minimum of resistance and at the same time exercise a wiping action upon the nozzle, keeping it clean at all times and avoiding any clogging of the discharge passages. As the powder material sweeps past the outer ends of the discharge passages, it will pick up the well distributed plasticizer and carry it off, with no tendency to form globules of powder and plasticizer or any other agglomeration.

In carrying out the process, the basic resin in finely divided form and other solid ingredients in finely divided form, such as heat stabilizers, pigments and fillers, if these be required, are charged into the vessel 10 through the upper opening 22 until the vessel is filled up to the level before mentioned. This opening 22 is then sealed and the vessel set into rotation, being heated at the same time through the units 37 until the temperature of the mix reaches between 200° and 250° F. At the same time, a vacuum is created in the interior of the vessel through the suction pipe 52.

While the mix is being tumbled and heated in the vessel 10, the liquid plasticizer in the tank 56 is heated to approximately the same temperature of the mix (i. e. from 200° to 250° F.). When the mix in the vessel has reached the desired temperature, and the liquid plasticizer has been heated to approximately the same temperature, the needle valve 57 is opened and the plasticizer is permitted under atmospheric pressure to be forced into the feed pipe 53 and out through the submerged discharge nozzle 54 directly within the mass of material being treated. Due to the rotation of the mixing vessel, some of the particles will be carried around in the same direction and some will fall back in the opposite direction as they are carried up the ascending wall of the rotating vessel. Nevertheless, the discharge nozzle 54 will remain submerged at all times and will therefore continue to discharge the liquid plasticizer directly into the mix, insuring the complete and uniform coating or impregnation of the basic resin with the solvent plasticizer. The mixing and plasticizing operation will take about thirty minutes, after which the machine is stopped and the material discharged from the bottom opening 27. The resulting mix will be in powder form ready for molding or extrusion.

As will be understood, the form of the discharge nozzle 54 may be considerably varied, so long as it functions to deliver within the body of the mix the proper quantity of plasticizer in the allotted time. The small discharge passages shown have been found to give excellent results, both in controlling the rate of flow of the plasticizer and in distributing it through the mix during the tumbling action of the rotating vessel.

It may also be noted that the invention is not limited in its use to a heat-vacuum process such as is disclosed in the aforesaid Strube application. It is equally applicable to the so-called Hungerford Process, such as disclosed in the Sandler Patents Nos. 2,477,009 and 2,477,269, which involve the use of hot dried air under superatmospheric pressure in carrying out the mixing process. In said Sandler patents, the liquid plasticizer is introduced into the vessel in the form of an atomized spray which must be directed against the batch of material and away from the bare walls of the vessel. By the use of a submerged discharge nozzle, such as herein disclosed, the Hungerford Process could be vastly improved, notwithstanding its defects in other respects.

What is claimed is:

1. In an apparatus for plasticizing finely divided resin, the combination of a rotary vessel to contain said resin, means for rotating the vessel to cause the resin contents to tumble and become mixed, and means located within the rotating vessel for delivering a liquid plasticizer within the body of the mass while it is being tumbled and mixed, said means comprising a stationary discharge nozzle located below the surface of the mass and submerged therein, and said discharge nozzle at one side being tapered to a narrow edge and being formed with a series of passages emerging from said narrow edge, to avoid clogging of said passages and to insure a better mixing of the resin particles and the plasticizer.

2. A combination according to claim 1, wherein the passages of the discharge nozzle extend in the direction of rotation of the mixing vessel and wherein said discharge nozzle at the opposite side is also tapered to a narrow edge to minimize the resistance to the flowing material.

3. In an apparatus for plasticizing finely divided resin, the combination of a rotary vessel to contain said resin, means for rotating the vessel to cause the resin contents to tumble and become mixed, and means located within the rotating vessel for delivering a liquid plasticizer within the body of the mass while it is being tumbled and mixed, said means comprising a stationary discharge nozzle located below the surface of the mass and submerged therein, and said discharge nozzle being diamond shaped in cross section, tapered down to knife edges at its front and rear sides respectively, and formed with a series of passages emerging from one of said narrow edges and opening into the mass over an extended area.

References Cited in the file of this patent
UNITED STATES PATENTS

| Number | Name | Date |
|---|---|---|
| 528,289 | Cross | Oct. 30, 1894 |
| 2,122,551 | Allingham | July 5, 1938 |
| 2,272,847 | Macht | Feb. 10, 1942 |
| 2,280,518 | Ball | Apr. 21, 1942 |
| 2,477,009 | Sandler | July 26, 1949 |
| 2,477,269 | Sandler | July 26, 1949 |